(No Model.)
M. CASSIDY.
VEHICLE SHAFTS.
No. 416,153. Patented Dec. 3, 1889.
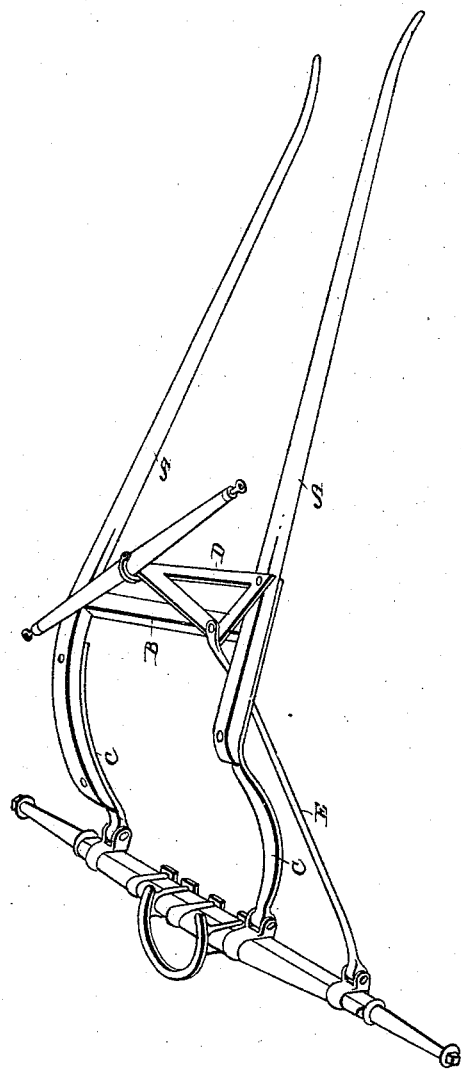
Witnesses
Inventor
By his Attorneys, Michael Cassidy.

UNITED STATES PATENT OFFICE.

MICHAEL CASSIDY, OF CALAMINE, WISCONSIN.

VEHICLE-SHAFT.

SPECIFICATION forming part of Letters Patent No. 416,153, dated December 3, 1889.

Application filed August 22, 1889. Serial No. 321,580. (No model.)

*To all whom it may concern:*

Be it known that I, MICHAEL CASSIDY, a citizen of the United States, residing at Calamine, in the county of Lafayette and State of Wisconsin, have invented a new and useful Vehicle-Shaft, of which the following is a specification.

My invention relates to improvements in vehicle-shafts; and it consists in certain novel features, hereinafter described and claimed.

In the accompanying drawing the figure is a perspective view of my improved shaft applied to a buggy.

My improved shafts comprise the thills A A, which are connected near their rear ends by the whiffletree-bar B, as shown. One of the thills is nearly straight, while the other one is made to extend across the front of the vehicle, so that the horse will be caused to travel on the side of the road and not on the central ridge of the same. The right-hand thill is made somewhat shorter than the left-hand thill, and the thill-iron C is secured to the said thill and is curved so as to be given an approximately J shape, so that it is made to pass sharply downward and then inward to the thill-couplings. By this arrangement the thills are made to clear the front spring of the vehicle when turning to the right. The left-hand thill is extended directly to the thill-coupling, and is out of line with the front spring of the vehicle, so that it will readily clear the same when turning to the left.

A draw-iron or evener-bar D is secured on the upper side of the whiffletree-bar B and the right-hand thill, and the whiffletree is mounted on the ends of this evener-bar. The evener-bar is secured at a point to the right of the central line of the vehicle, and a rod E extends from the same to the front axle and is secured to the axle near the left-hand end of the same, as shown. By this arrangement I overcome the tendency of the vehicle to turn to the left.

From the foregoing description, taken in connection with the accompanying drawing, it will be seen that I have provided a device by the use of which the horse will be caused to travel to the left-hand side of the road or track and thereby given a smooth path, and also affording the driver an unobstructed view of the road. The advantages of my device are thought to be obvious, and further enlargement thereon is deemed unnecessary.

Having thus described my invention, what I claim, and desire to secure by Letters Patent, is—

1. In a vehicle-shaft of the character described, the combination, with the right-hand thill, of the curved thill-iron secured thereto and extending downward therefrom and then inward to the thill-coupling, as set forth.

2. The combination of the axle, the left-hand thill coupled thereto near the end of the same, the right-hand thill, the curved thill-iron C, secured to the right-hand thill, extending downward and rearward therefrom, and coupled to the axle at the center of the same, the whiffletree-bar connecting the thills, the evener-bar secured on the whiffletree-bar and the right-hand thill, and the rod E, having its rear end attached to the axle near the right-hand end of the same and its front end attached to the inner end of the evener-bar, as specified.

In testimony that I claim the foregoing as my own I have hereto affixed my signature in presence of two witnesses.

MICHAEL CASSIDY.

Witnesses:
W. J. HOOPER,
JERRY EVANS.